(No Model.)
T. J. CLOSE.
MOISTENING DEVICE.
No. 527,049. Patented Oct. 9, 1894.
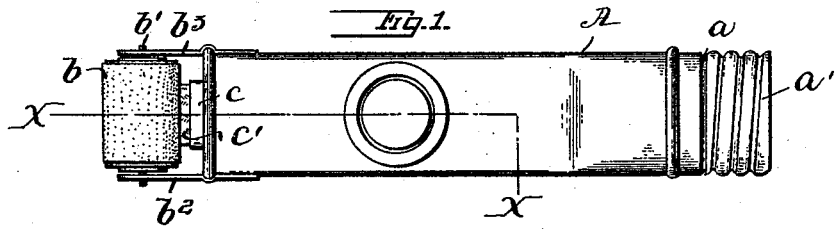
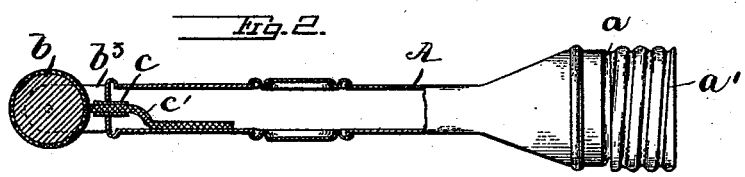
Witnesses.
Jesse B. Heller
Chas. C. Collier.
Inventor.
Thomas J. Close
by
Chas. B. Collier,
Attorney.

UNITED STATES PATENT OFFICE.

THOMAS J. CLOSE, OF PHILADELPHIA, PENNSYLVANIA.

MOISTENING DEVICE.

SPECIFICATION forming part of Letters Patent No. 527,049, dated October 9, 1894.

Application filed July 20, 1894. Serial No. 518,076. (No model.)

*To all whom it may concern:*

Be it known that I, THOMAS J. CLOSE, a citizen of the United States, residing at the city of Philadelphia, in the State of Pennsylvania, have invented a new and Improved Moistening Device, of which the following is a full, clear, and exact description, reference being had to the accompanying drawings, forming part hereof.

My invention is designed and intended as a convenient device for effecting the moistening of postage stamps, envelopes, &c., or that part thereof to which adhesive mucilage has been applied; and the device possesses the advantages of being simple in construction, durable, not liable to get out of order and at the same time effective, while it can be made at a very small cost compared with other devices heretofore employed for such purposes.

Briefly stated, it consists of a tube, preferably made of flexible metal, such as brass, or one or more of the sides of which are made of brass, or other flexible and impervious material capable of containing water, the same being provided with a capped opening for the introduction of water and also with bearings for the support of a spool or roller having a covering preferably of felt or other absorbent material, the tube being also provided with an opening or openings in its outer end through which wicking or other similar material is passed into the tube, the outer end of such wicking material being placed in close proximity to, or impinging lightly against the spool or roller.

Referring to the drawings:—Figure 1, is a plan view and Fig. 2, a section on line $x$—$x$ of Fig. 1.

A, represents the body of the tube; $a$, the opening therein for the introduction of the liquid and $a'$ the cap therefor; $b$, the spool, or roller; $b'$, the shaft; $b^2$ $b^3$, the bearings therefor; $c$, the opening in the outer end of the tube and $c'$ the wicking. The spool or roller should preferably have applied to it, forming its outer surface, a layer of felt or other material capable of absorbing and holding moisture although the device could be used, but not with equal advantage, with the spool or roller of glass, rubber or other non-absorbent material, and the wicking material should be of such thickness as to form a close joint with the opening, $c$, in the outer end of the tube so as to prevent leakage of the liquid from the tube.

It is obvious that instead of a single slot or opening in the outer end of the tube, and a single strand of wicking material there may be two or more openings and two or more strands of wicking material.

The manner of using the device is obvious, namely, the tube being supplied with water through the opening $a$, and the opening being then closed by the cap $b$, the device is ready for use, and whenever it is desired to use the same in moistening the surface required to be moistened, pressure is applied to the flexible side of the tube which causes the moisture to be conveyed through the wicking to and upon the roller and from the latter it is spread upon the surface where desired.

It will be observed, as one of the advantages of my device that the roller in revolving over the surface does not extract therefrom the mucilage or dextrine as is done by moistening devices where the moistener rubs such surface.

Having now described my invention, what I claim as new, and desire to secure by Letters Patent, is—

In a device for moistening stamps, envelopes and other surfaces, a tube of impervious material with one or more flexible sides, said tube having an opening for the introduction of water, a cap or plug to close said opening, an opening at its outer end, wicking material extending through said outer opening and into said tube, in combination with a roller, placed in proximity to said wicking material, substantially as and for the purpose described.

In testimony whereof I have hereunto subscribed my name in the presence of two witnesses.

THOMAS J. CLOSE.

Witnesses:
ANDREW ZANE,
CHAS. C. COLLIER.